United States Patent
Laffrenzen (10) Patent No.: US 12,398,715 B2
(45) Date of Patent: Aug. 26, 2025

(54) HYDROSTATIC VARIABLE DISPLACEMENT AXIAL PISTON UNIT AND DISPLACEMENT VOLUME SETTING DEVICE

(71) Applicant: Danfoss Power Solutions GmbH & Co. OHG, Neumünster (DE)

(72) Inventor: Heiko Laffrenzen, Ostenfeld (DE)

(73) Assignee: DANFOSS POWER SOLUTIONS GMBH & CO. OHG, Neumünster (DE)

( * ) Notice: Subject to any disclaimer, the term of this patent is extended or adjusted under 35 U.S.C. 154(b) by 0 days.

(21) Appl. No.: 18/247,486

(22) PCT Filed: Oct. 4, 2021

(86) PCT No.: PCT/EP2021/077314
§ 371 (c)(1),
(2) Date: Mar. 31, 2023

(87) PCT Pub. No.: WO2022/144115
PCT Pub. Date: Jul. 7, 2022

(65) Prior Publication Data
US 2024/0003344 A1    Jan. 4, 2024

(30) Foreign Application Priority Data

Dec. 30, 2020   (CN) .......................... 202011624071.0
Dec. 30, 2020   (CN) .......................... 202023331568.1

(51) Int. Cl.
*F04B 49/00*     (2006.01)
*F04B 1/295*    (2020.01)
(Continued)

(52) U.S. Cl.
CPC ............ *F04B 49/002* (2013.01); *F04B 1/295* (2013.01); *F04B 1/324* (2013.01); *F16H 21/44* (2013.01); *F16H 61/433* (2013.01)

(58) Field of Classification Search
CPC ........ F04B 49/002; F04B 1/295; F04B 1/324; F16H 21/44; F16H 61/433
See application file for complete search history.

(56) References Cited

U.S. PATENT DOCUMENTS

| 5,205,201 A | 4/1993 | Göllner |
| 6,048,176 A | 4/2000 | Deininger |

(Continued)

FOREIGN PATENT DOCUMENTS

| CN | 1224124 A | 7/1999 |
| CN | 103958785 A | 7/2014 |

(Continued)

OTHER PUBLICATIONS

International Search Report mailed on Dec. 14, 2021, in connection with corresponding International Application No. PCT/EP2021/077314; 3 pages.

(Continued)

*Primary Examiner* — Dominick L Plakkoottam
(74) *Attorney, Agent, or Firm* — McCormick, Paulding & Huber PLLC (57) ABSTRACT

A displacement volume setting device of a hydrostatic variable displacement axial piston unit includes an input device for providing a displacement command. Displacement volume adjusting means set the tilt angle of a displacement element according to the displacement command. A linkage element has an input coupling element connected to the input device, an output coupling element connected to the displacement volume adjusting means, and a connecting element. The input coupling element and the output coupling element are connected by the connecting element which is elastically deformable if a force resulting from the high pressure level present at the hydrostatic axial piston unit and acting on the output coupling element exceeds a predeter- (Continued)

mined threshold value. Also disclosed is a hydrostatic variable displacement axial piston unit.

17 Claims, 3 Drawing Sheets

(51) Int. Cl.
  *F04B 1/324* (2020.01)
  *F16H 21/44* (2006.01)
  *F16H 61/433* (2010.01)

(56) References Cited

U.S. PATENT DOCUMENTS

| | | | | |
|---|---|---|---|---|
| 6,119,456 | A * | 9/2000 | Louis | F16H 61/433 60/443 |
| 6,311,607 | B1 * | 11/2001 | Muller | F04B 1/324 92/12.2 |
| 10,227,996 | B2 * | 3/2019 | Thoms | F04B 49/002 |
| 2007/0137475 | A1 * | 6/2007 | Reimer | F01B 3/0002 91/505 |
| 2017/0120708 | A1 * | 5/2017 | Mainz | B60G 11/52 |

FOREIGN PATENT DOCUMENTS

| | | |
|---|---|---|
| CN | 104421123 A | 3/2015 |
| CN | 106627020 A | 5/2017 |
| CN | 215256630 U | 12/2021 |
| DE | 199 02 107 A1 | 7/1999 |

OTHER PUBLICATIONS

English machine translation summary of Chinese Office Action, in connection with corresponding Chinese Pat. App. No. 202011624071.0, dated Dec. 25, 2024.

* cited by examiner

Figure 5

HYDROSTATIC VARIABLE DISPLACEMENT AXIAL PISTON UNIT AND DISPLACEMENT VOLUME SETTING DEVICE

CROSS-REFERENCE TO RELATED APPLICATIONS

This application is a National Stage application of International Patent Application No. PCT/EP2021/077314, filed on Oct. 4, 2021, which claims priority to Chinese Patent Applications No. 202011624071.0, filed on Dec. 30, 2020, and No. 202023331568.1, filed on Dec. 30, 2020, each of which is hereby incorporated by reference in its entirety.

TECHNICAL FIELD

The invention is related to hydrostatic variable displacement axial piston units. In particular, the invention is related to a displacement volume setting device of a hydrostatic variable displacement axial piston unit.

BACKGROUND

Hydraulic work vehicles are often equipped with hydrostatic variable displacement axial piston units which are driven by an internal combustion engine in order to generate hydraulic pressure which can be, for example, converted into propulsion of the vehicle by means of hydraulic motors. In most cases the displacement volume of a hydrostatic motor propelling the vehicle, or actuating the work function, is constant. The speed of the hydraulic motor and/or an (auxiliary) work function is controlled by controlling the displacement volume of the hydrostatic axial piston pump. Therefore, it follows that the tilt angle of a displacement element of the hydrostatic variable displacement axial piston unit must be adjustable.

The tilt angle of the displacement element is adjusted according to input commands from the vehicle operator which are transferred via certain interfaces like pedals, or levers to the displacement element of the hydrostatic variable displacement axial piston unit by providing rigid mechanical link elements. Hydrostatic variable displacement axial piston units equipped with rigid linkage elements are often referred to as direct displacement control units.

As the linkage between the axial displacement unit and the operator input device is rigid, loads acting on the displacement unit increase the force which is required to hold the linkage in place, and also provide non-desirable mechanical feedback signals to the input device.

If the vehicle operator increases the force at the input command device, the hydraulic power which is generated by the hydrostatic variable displacement axial piston unit should also increase. In case the tilt angle of the displacement element cannot be adapted to a new load situation—as it would be normal behaviour of the hydrostatic variable displacement unit—the rotational speed of the combustion engine is forced to decrease, this could lead to engine stalling, especially if the input commands of the operator prevent the hydrostatic variable displacement unit from adapting to the increasing load on the work vehicle. The internal combustion engine is then required to provide more power to the hydrostatic unit and therefore forced to operate at a different torque-speed ratio, which in turn deviates from the designed torque/speed ratio. At this different torque-speed ratio the efficiency of the internal combustion engine is worse than when being operated under target operating conditions. A system overload can occur as the internal combustion engine may not be able to provide enough power for the deviating system state. This does not only result in increased fuel consumption; it can also cause the engine to stall if the required torque surpasses the torque which can be provided by the internal combustion engine.

SUMMARY

It is, therefore, an object of the invention to provide a displacement volume setting device capable of providing a direct mechanical connection between an operator input device and a displacement element of a hydrostatic variable displacement axial piston unit, wherein the displacement volume setting device is configured to overdrive the operator input command, when necessary, for maintaining the target operating conditions, or to avoid stalling the internal combustion engine.

The objective is solved by a displacement volume setting device according to claims 1 to 9 and by a hydrostatic variable displacement axial piston unit provided with claims 10 and 11.

The displacement volume setting device of a hydrostatic variable displacement axial piston unit, according to the invention, comprises an input device for providing a displacement command. Preferably the input device is a mechanical device which is moved in order to adjust the displacement volume and therewith the volumetric flow rate of the axial piston unit. The input device can be arranged remote from the hydrostatic variable displacement axial piston unit, e.g., in the operator's drive cabin of a work vehicle.

The displacement volume setting device according to the invention further comprises displacement volume adjusting means for setting the tilt angle of a displacement element according to the displacement command provided via the input device. According to the invention a movement of the displacement volume adjusting means leads to a change of the tilt angle of the displacement element, and ultimately to a change of the displacement volume of the axial piston unit. Preferably the displacement volume adjusting means is also provided as a mechanical device being attached to the displacement element and capable of transferring forces which act on a displacement volume adjusting means, to the displacement element, and vice versa from the displacement element towards the input device. The displacement volume adjusting means can be, for example, a lever or rod connection to the displacement element which can be, e.g., a swashplate or a yoke.

According to the invention, the displacement volume setting device comprises a linkage element having an input coupling element connected to the input device, an output coupling element connected to the displacement volume adjusting means, and a connecting element connecting the input coupling element with the output coupling element. The connecting element transmits the displacement command coming from the input device, via the input coupling element, to the output coupling element, and therewith further to the displacement volume adjusting means. The connecting element shows a non-elastic behaviour in general, however the element is elastically deformable if a force resulting from the high-pressure level present at/in the hydrostatic variable displacement axial piston unit exceeds a predetermined threshold-value.

The hydrostatic variable displacement axial piston unit can be e.g. a hydrostatic pump which is connected via a high-pressure line to a hydraulic consumer, e.g. a hydraulic motor. If a load which counteracts the force/movement of the hydraulic consumer is increasing the pressure level in the high-pressure line rises, therewith increasing the pressure difference which has to be generated by the hydrostatic variable displacement axial piston pump between its inlet and its outlet. This could be the case if a vehicle which is hydraulically propelled by a hydraulic motor is driving uphill, or driving/pushing/pulling against an obstacle. An axial piston unit reacts to an increasing load at the high-pressure side with a tilting of its displacement element towards lower displacement volumes, thereby lowering the volumetric flow through the pump and increasing the pressure difference between inlet and outlet of the pump if, for example, in such a case the speed of a working vehicle should be maintained the input command has to be adapted. In the case of a direct displacement controlled hydraulic pump, this can only be done by commanding the displacement element to a bigger tilt angle however, a bigger tilt angle causes a bigger torque to be provided by the drive engine, with the negative consequences already mentioned before.

For commands increasing the displacement volume causing a relatively low pressure change at the high-pressure side of the hydrostatic axial piston unit, the displacement command is directly, and rigidly, forwarded to the displacement volume adjusting element, and a load feedback is directly, and rigidly, transferred the opposite way from the displacement volume adjusting means back towards the input device.

If a force resulting from a higher pressure level acting on the displacement element of the hydrostatic axial piston unit, and acting on the output coupling element, is higher than the predetermined threshold value the connecting element according to the invention decouples the movement of the input coupling element from the movement of the output coupling element by elastic deformation. Therefore, the tilt angle of the displacement element is no longer directly controlled by the input device. This elastic deformation allows the output coupling element to move relative to the input coupling element and avoid therewith overload of the drive engine by enabling the displacement adjusting element to recede such that the displacement element is able to swivel back to a lower tilt angle.

This elastic deformation provides a limit for forces resulting from the high-pressure side of the hydraulic axial piston unit to a predetermined threshold value. A magnitude of loads acting on the hydraulic axial piston unit below the predetermined threshold value allows the drive engine to maintain an economic range of operational condition, and/or prevents the engine from suffering damage. Further a direct feedback of the load acting on the displacement element can be forwarded to the input device. On the other hand, a mechanical non-feedback behaviour is provided if an adaptation of the tilt angle is required, due to an external load representative value that is higher than the threshold value.

The predetermined threshold value can be set by a pre-tensioning force on the connecting element. A pre-tensioned connecting element acts as rigid when transferring loads from the input coupling element to the output coupling element, and vice versa, if the force exerted on the connecting element is lower than the pre-tensioning force. Therefore, it follows that if the pre-tensioned connecting element is elastically deformable, it could be set such that it is deformed, for example, if a load acting upon the hydraulic axial piston unit is higher than a threshold value set by the pre-tensioning force.

According to the invention the pre-tensioning force of the connecting element can be adjustable. The magnitude of the pre-tensioning force influences the behaviour of the hydraulic work machine (vehicle). If the pre-tensioning force is high a rigid feedback between the input coupling element and the output coupling element is provided even when external loads are high. If the pre-tensioning force and thereby the threshold value is low, the displacement volume setting device will react more smoothly to external loads and displacement commands provided via the input device, if they would cause a high-pressure level higher than the threshold value.

For implementing this the connecting element can comprise a spring or another type of elastically deformable element. The material choice for the elastically deformable element can be made from a wide range, including but not limited to metal, plastic or reinforced plastic. Thereby, the elastically deformable element can comprise in any arbitrary form, for example; an extension spring, a compression spring, a torsion spring or any other type of spring. The connecting element could also be designed as an elastic washer, lock washer, bursting disk, screw, or bolt, or a similar device.

It is covered by the concept of the invention to provide a partially elastic element, comprising parts that are rigid under any operating condition, and parts which are elastically deformable if a force resulting from the high-pressure level, and acting on the output coupling element, exceeds a predetermined threshold value which is set by the pre-tensioning force of the elastically deformable element.

The elastically deformable element could also be designed as pre-tensioned rope, cable, pole, or post with small diameters such that the elements are elastically deformable if a force acting upon the elements surpasses the predetermined threshold value. The elastic connecting element may be capable of transmitting tensile forces and/or compression forces depending on the design of the linkage element. The connecting element can also comprise a combination of the components, as described.

Further the linkage element can comprise end-stops limiting the elastic deformation of the connecting element, wherein dampening elements can be arranged at the end-stops. By providing end-stops a force range for elastic behaviour of the connecting element is defined. A lower end of the range is defined by the magnitude of the predefined threshold value, and an upper end of the range is defined by the position of the higher end-stop, and therewith the corresponding maximum elastic deformation force. If the force acting on the output coupling element is outside of the force range the connecting element performs elastically. If the force is within the force range the connecting element serves as a rigid force transmission device. If the force is lower than the pre-tensioning force a rigid transmission without causing elastic deformation of the connecting element is provided. If the force is higher than the pre-tensioning force the linkage element transmits displacement commands elastically until an end-stop is contacted.

Dampening elements, e.g. vibration absorbers, crane buffers, foam rubber or similar elements can smoothen the transition from an elastic behaviour of the connecting element to a rigid behaviour of the connecting element. Additionally, dampening elements can eliminate vibrations thereby providing a more comfortable load feedback to the operator of the variable displacement axial piston unit.

The input device for providing a displacement command can be a joystick, a lever, a pedal or a similar device for providing a mechanical input command. Preferably, the movement of the input device is transmitted to the displacement element via mechanical transmission means, e.g. the linkage element, defining a movement/transmission ratio such that a comfortable/economic operation of the axial piston unit can be obtained.

The displacement command can also be an electric signal, or hydraulic pressure that is translated mechanically, via a solenoid or a servo unit onto the input coupling element. The mechanical movement of the input coupling element can therefore be forwarded to the displacement element, as described. Feedback of the load acting on the high-pressure side of the hydrostatic axial piston unit is transmitted via the linkage element to the input device where it can be used as feedback to the system operator, or to a system control unit, for instance, to adapt the engine drive speed.

As mentioned earlier, the linkage element can transmit linear and/or rotational movements. It is also covered by the spirit of the invention that the linkage element transmits a combination of linear and/or rotational movements.

The hydrostatic variable displacement unit can be of the swashplate or the bent axis type. It is common knowledge of a person with skills in the relevant art that in the first case the displacement element is a tiltable swashplate, also called swivel element, whereas in the second case the displacement element is a yoke.

Even though the inventive concept is described with a hydraulic axial piston pump, any hydrostatic axial piston unit can be equipped with a displacement volume setting device according to the invention. Hence, a hydrostatic axial piston unit equipped with the displacement volume setting device according to the invention can be a hydrostatic motor, a hydrostatic pump, and/or a part of a hydrostatic transmission.

BRIEF DESCRIPTION OF THE DRAWINGS

In the following Figures exemplary embodiments of a displacement volume setting device of a hydrostatic variable displacement axial piston unit according to the invention are shown. The presented embodiments can be combined with each other without leaving the spirit of the inventive concept. Combinations and alterations of the embodiments which are not shown in the Figures or in the description above, however within the knowledge of a person with skills in the relevant art, are covered by the spirit of the invention as well. The presented embodiments do not limit the scope of the invention. The following Figures show.

DETAILED DESCRIPTION

Although the following Figures show different embodiments of the invention, the same reference numerals are used for comparable components independently of the specific embodiment.

Figure 1:
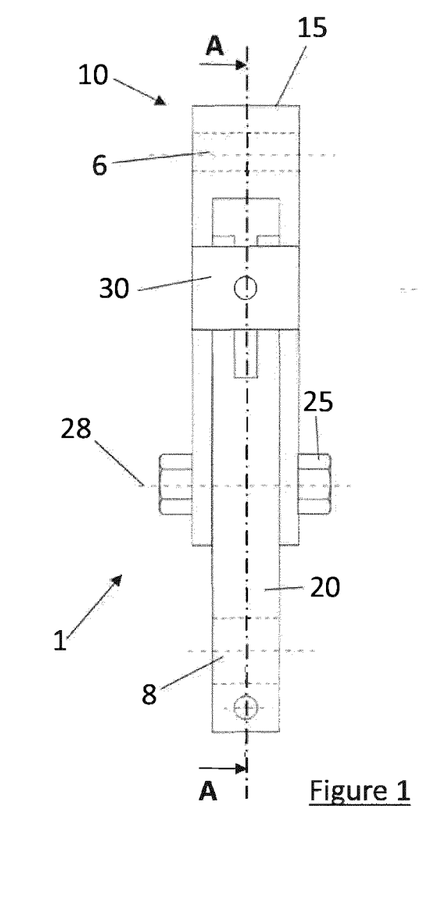
FIG. 1 shows a first embodiment of a displacement volume setting device according to the invention in a side view.

FIG. 1 shows a side view of a first embodiment of a linkage element 10 of a displacement volume setting device 1 according to the invention. The linkage element 10 comprises an input coupling element 15 and an output coupling element 20, both provided as separate parts. The input coupling element 15 and the output coupling element 20 are capable of rotating relative to each other around a pivot axis 28, wherein both are connected to a pivot pin 25 serving as a common centre of rotation. The input coupling element 15 is connected to an input device 6, and the output coupling element 20 is connected to displacement volume adjusting means 8. The relative rotation between the output coupling element 20 and the input coupling element 15 is limited by a connecting element 30, arranged in the flow of forces between the input coupling element 15 and the output coupling element 20.

Figure 2:
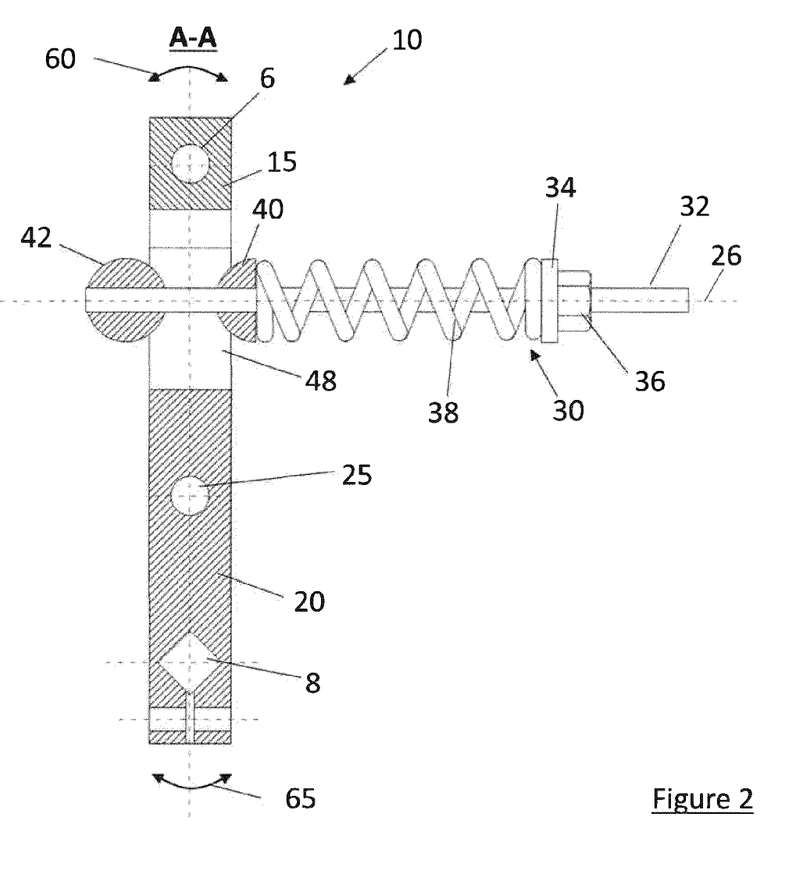
FIG. 2 shows the embodiment of FIG. 1 in a sectional view.

The connecting element 30—shown in more detail in FIG. 2—comprises a guiding rod 32 on which a spring 38 is movably arranged. The spring 38 abuts on one side against a spring seat 40 and on the other side against a washer 34 which is held in position by a nut 36. The guiding rod 32 is inserted into an opening 48 which is formed in the input coupling element 15 and the output coupling element 20. On the end of the guiding rod 32 opposite to the spring 38 and protruding through the opening 48 a rod end pin 42 is fixed, such that the relative position of the input coupling element 15 and the output coupling element 20 is limited in one direction by the rod end pin 42. In the other direction movability of pin 32 is limited by a spring seat 40. The convex surfaces on spring seat 40 and on rod end pin 42 can be—as shown in this embodiment—received by concave notches which are shaped in the input coupling element 15 and the output coupling element 20 likewise. The pairing of convex and concave surfaces guarantees that a guiding rod axis 26 can be held stationary when the input coupling element 15 and/or the output coupling element 20 rotate around the pivot pin 25. The guiding rod 32, as shown in the embodiment of FIGS. 2, is threaded, such that the nut 36 can be screwed onto the guiding rod 32 and is held in position by the thread. By tightening the nut 36 towards the spring seat 40 a compression force is exerted on the spring 38 via the washer 34 which leads to a force pressing the spring seat 40 against the input coupling element 15 and the output coupling element 20. This compression force can be set according to the selected threshold value for the permitted high-pressure level acting on the displacement element of the hydrostatic unit.

The displacement volume setting device 1 in the embodiment of FIGS. 1 and 2 can be installed to a variable displacement axial piston unit. Before starting to operate the variable displacement axial piston unit the spring 38 can be pre-tensioned by adjusting the position of the nut 36 on the guiding rod 32. If the nut 36 is screwed towards the spring seat 40 the pre-tensioning force of the spring 38 is increased, whereas the pre-tensioning force is lowered if the nut 36 is screwed in the opposite direction.

In nominal operating condition, an input command is provided, for example by the movement of an input lever, which is set via the input device 6. The input command leads to a rotation of the input coupling element 15, indicated by the bi-directional arrow 60. The rotation of the input command is transmitted via the input coupling element 15 to the spring seat 40 or the rod end pin 42, depending on the direction of rotation of the input coupling element 15. If the force which is exerted by the rotational movement of the input coupling element 15 on the spring seat 40 or the rod end pin 42 is lower than the pre-tensioning force of the spring 38 the rotation of the input coupling element 15 will be non-elastically passed on towards the output coupling element 20 which rotates in the same direction around the pivot pin 25 as the input coupling element 15, and transmits the rotation to the displacement volume adjusting means 8 leading to a change in the tilt angle of the displacement element of the axial piston unit (not shown).

If the direction of force is inversed, i.e. if a force is exerted by the displacement volume adjusting means 8 on the output coupling element 20, such that the output coupling element 20 rotates around the pivot pin 25 as the centre of rotation (see bi-directional arrow 65) the principle described in the preceding paragraph can be applied vice versa. If the force which is exerted by the rotation of the output coupling element 20 on the spring seat 40 or the rod end pin 42, is smaller than the pre-tensioning force of the spring 38 representing a predefined threshold for the high-pressure level, the connecting element 30 shows a rigid behaviour and transmits the rotation of the output coupling element 20 directly to the input coupling element 15. The input coupling element 15 is connected to the input device 6, providing therewith a direct (mechanical) feedback of the load acting on the displacement volume adjusting means 8, to the input device 6.

This means that the operator of the hydrostatic variable displacement axial piston unit can feel the loads acting on the working machine (vehicle) transmitted via the displacement volume adjusting means 8. Example given, if an obstacle occurs in the drive path of a vehicle which is propelled by an axial piston unit according to the invention, the operator, after sensing at the input device 6 an increase of the load can react to the increasing load, if necessary.

However, if the load acting on the displacement volume adjusting means 8 surpasses the magnitude of the threshold value, which is set by the pre-tensioning force of the spring 38, the rotation of the output coupling element 20 leads to a force at the rod end pin 42 or the spring seat 40 which is higher than the pre-tensioning force of the spring 38. This means that the spring 38 is compressed and a relative rotation between the input coupling element 15 and the output coupling element 20 is permitted, as the connecting element 30 shows an elastic behaviour.

The elastic behaviour of the connecting element 30 enables a decoupled movement of the input coupling element 15 and the input device 6 from the movement of the output coupling element 20 and the displacement volume adjusting means 8 which are connected to the output coupling element 20. It is therefore possible that the hydraulic unit, which is controlled by the input device 6, can adjust its tilt angle independently from the input command. Thereby, a stable and effective point of operation can be maintained for the internal combustion engine and the engine will not be operated in torque ranges where the risk of very low efficiency or stalling the engine is present. According to the invention the displacement element will tilt back and reduce the displacement volume, wherein the displacement volume adjusting means 8 will transmit the decrease of the tilt angle to the output coupling element 20, if a high load present at the high-pressure side of the hydrostatic variable displacement axial piston unit exceeds the threshold value. With reduction of the displacement volume the torque which is required from the internal combustion engine is reduced, too.

A person skilled in the relevant art knows many devices which are comparable to the spring 38 and which can be pre-tensioned in a similar way. For example extension springs, torsion springs or any other type of spring or other elastically deformable devices and/or materials can be applied. Also, different means for pre-tensioning the elastically deformable device than the nut 36 in combination with the washer 34 could be provided by, for example a clip or a latching means. It is also covered by the invention to transfer the concept shown in the embodiment of FIGS. 1 and 2, from the predominately rotational movement domain, to the linear movement domain.

Figure 3:
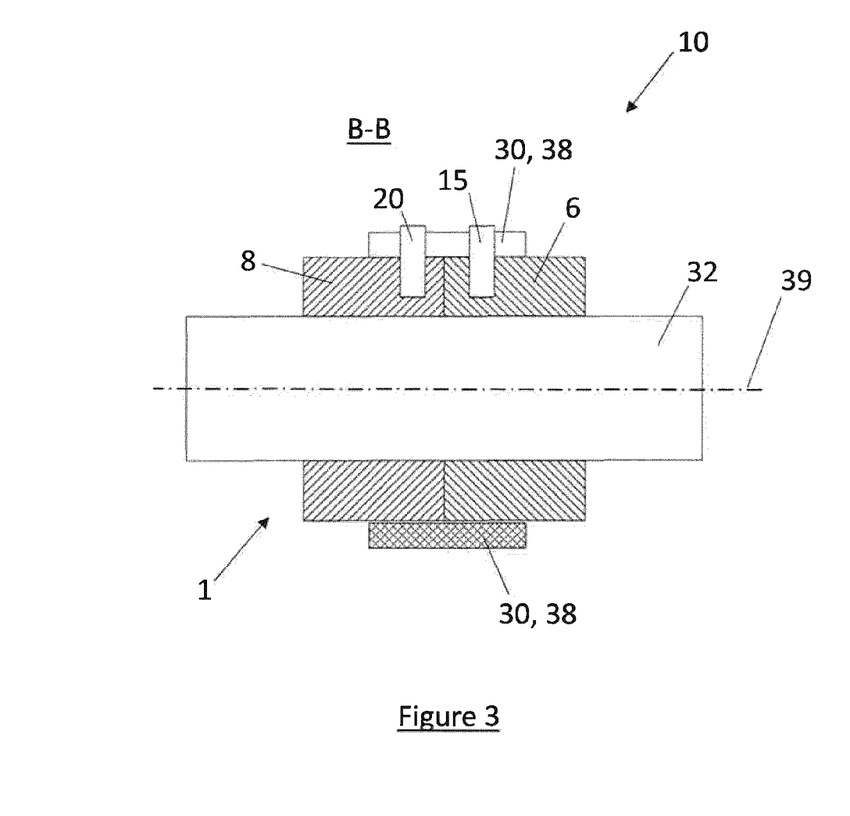
FIG. 3 shows a second embodiment of a displacement volume setting device according to the invention in side view.
Figure 4:
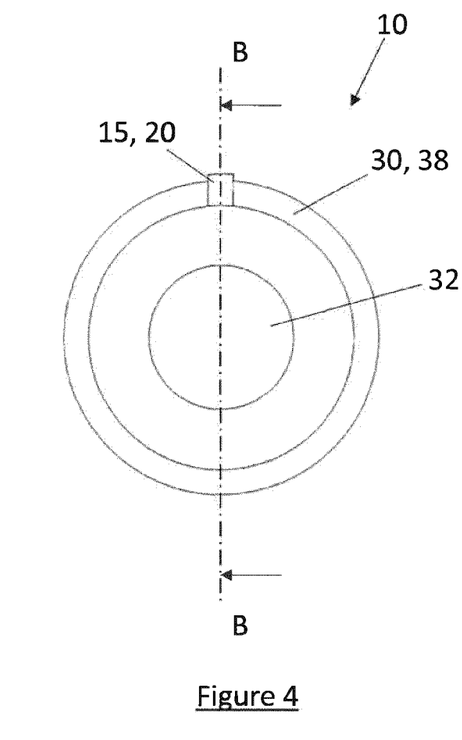
FIG. 4 shows the embodiment of FIG. 3 in a sectional view.

FIGS. 3 and 4 show a second embodiment of a linkage element 10 of a displacement volume setting device 1 of a hydrostatic variable displacement axial piston unit which is applicable for transmitting relative rotational movements between an input device 6 and a displacement volume adjusting element 8. The input device 6 is connected to the input coupling element which is designed as a first pin 15. The displacement volume adjusting means 8 are connected to another second pin 20, which serves as an output coupling element. The first pin 15 and the second pin 20 are connected by a rotational spring 38, serving as connecting element 30. The spring 38, the input device 6 and the displacement volume adjusting element 8 share a common centre of rotation 39 which is defined by the guiding rod (shaft) 32. The input device 6 and the displacement volume adjusting means 8 are moveably arranged on the shaft 32, at least in a rotational direction.

In the embodiment according to FIGS. 3 and 4 the rotational motion and the corresponding torque acting on the displacement volume adjusting means 8 are transferred via the second pin 20 to the connecting element 30, which acts rigidly when the force balance between the input coupling element 15 and the output coupling element 20 is lower than its pre-tensioning force defining the threshold value. The torque of the displacement volume adjusting means 8 is then rigidly transferred to the input device 6, and vice versa. If the force balance between the input coupling element 15 and the output coupling element 20 is higher than the pre-tensioning force (predefined threshold value) the connecting element 30 is elastic and therefore the torque of the displacement volume adjusting means 8 is decoupled from the input device 6, allowing a load-dependent reaction of the axial piston unit.

Figure 5:
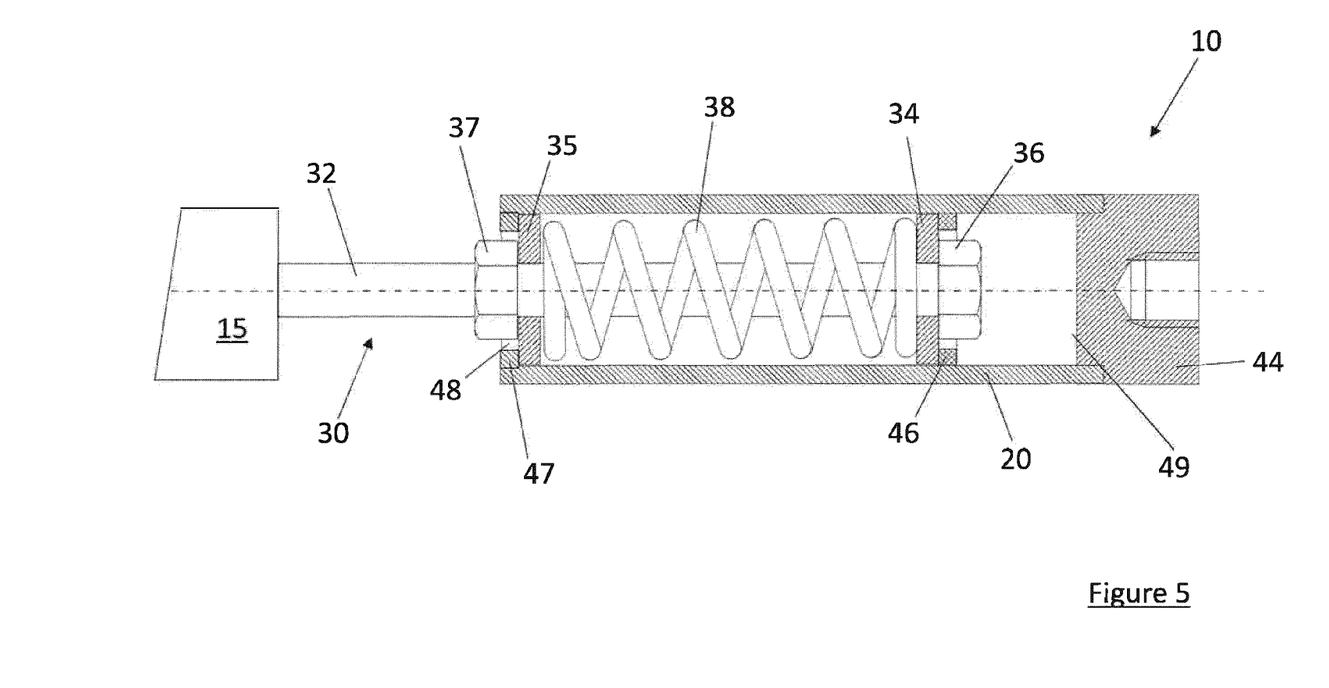
FIG. 5 shows a third embodiment of a displacement volume setting device according to the invention in a sectional view.

FIG. 5 shows a linkage element 10 in sectional view applying the principles of linear motion. The linkage element 10 comprises a guiding rod 32 which is part of a connecting element 30. The guiding rod 32 is actuated on its free end by an input coupling element 15. On the opposing end of the guiding rod 32 which is in the case of the embodiment according to FIG. 5 threaded a spring 38 is movably arranged and is fixed between a first washer 34 and a second washer 35. First washer 34 and second washer 35 are arranged between a first nut 36 and a second nut 37 and held in position by the first and second nut 36, 37, respectively. The washers 34, 35 abut on sides facing away from the spring against a first shoulder 46 and second shoulder 47 of a housing 20 serving as an output coupling element. The housing 20 comprises a first opening 48 and a second opening 49 and surrounds the spring assembly circumferentially. The guiding rod 32 protrudes from the first opening 48 towards the input coupling element 15. The second opening 49 of the output coupling element 20 is closed by an end-stop 44 which is provided as an end cap.

The pre-tensioning force of the spring 38 can be adjusted by screwing the nuts 36, 37 on the guiding rod 32 and thereby changing the distance between the first and second nut 36, 37 and the two corresponding washers 34, 35. If the distance between the first and second nuts 36, 37 is higher than the distance between the shoulders 46, 47 the washers 34, 35 will be pressed against the shoulders 46, 47 by the reaction force of the spring 38. In the case that the distance between the two nuts 36, 37 is smaller than the distance between the two shoulders 46, 47, the washers 34, 35 are arranged with clearance to the shoulders 46, 47 and are—at least for a certain distance—freely movable on the rod 32. Preferably, in a starting position, the distance between the nuts 36, 37 and between the shoulders 46, 47 is substantially the same, such that the washers 34, 35 abut simultaneously against the nuts 36, 37 and against the shoulders 46, 47 as long as a force difference of two opposing forces facing each other is lower than the pre-tensioning force. In their starting position the washers 34, 35 are then in a clearance-free connection with the shoulders 46, 47, and with the nuts 36, 37 as they are pressed towards the nuts 36, 37 by the reaction force of the spring 38.

If the force balance between a force exerted by the input coupling element 15 towards the housing 20—representing the output coupling element—and a force exerted by the displacement volume adjusting element in opposite direction on housing 20, is smaller than the pre-tensioning force of the spring 38, the connecting element 30 acts non-elastically and transmits the forces from the housing 20 (output coupling element) directly to the input coupling element 15 and vice versa, wherein the force is passed via the first shoulder 46 to the first washer 34 to the spring 38 to the second washer 35 to the nut 37 on the guiding rod 32 and vice versa.

If the difference between the forces at the input coupling element 15 and the output coupling element 20 are higher than the threshold which is predefined by the pre-tensioning force, the spring 38 is compressed, such that a relative movement between the output coupling element 20—housing 20—and the input coupling element 15 becomes possible. If the output coupling element 20 is, example given, pushed towards the input coupling element 15 which is held in place and a displacement force at the output coupling element 20 is higher than the pre-tensioning force of the spring 38, the spring 38 is compressed towards the input coupling element 15 and the distance between the output coupling element 20 and the input coupling element 15 is decreased. If the spring 38 comprises a linear characteristic, the distance between the input coupling element 15 and the output coupling element 20 is directly proportional to the displacement force.

An end-stop 44 is provided which limits the relative movement between the output coupling element 20 and the input coupling element 15 in the case that the displacement force is very high. If the end-stop 44 is in contact with the first nut 36, the force of the output coupling element 20 is transferred directly towards the input coupling element 15, comparably to the non-elastic case. The connecting element 30 therefore does show elastic behaviour, when the displacement force is higher than a first threshold value defined by the pre-tensioning force and lower than a second predefined threshold value defined by the force which is required that end-stop 44 is in contact with the first nut 36.

From the disclosure above and the accompanying Figures and claims, it will be appreciated that the displacement setting device according to the invention and the hydraulic unit according to the invention offer many possibilities and advantages over the prior art. It will be appreciated further by a person skilled in the relevant art that further modifications and changes could be made to the displacement volume setting device and to a hydrostatic variable displacement axial piston unit according to the invention without parting from the spirit and scope of this invention. Hence, such modifications and changes are within the scope of the claims and covered by them. It should be further understood that the examples in the embodiments described above are for illustrative purpose only and that various modifications, changes or combinations of embodiments in the light of thereof which will be suggested to a person skilled in the relevant art are included in the spirit and purview of this application.

What is claimed is:

1. A displacement volume setting device of a hydrostatic variable displacement axial piston unit comprising:
    an input device for providing a displacement command,
    a displacement volume adjusting means for setting the tilt angle of a displacement element according to the displacement command,
    a linkage element having:
        i) an input coupling element connected to the input device,
        ii) an output coupling element connected to the displacement volume adjusting means, and
        iii) a connecting element connecting the input coupling element with the output coupling element, wherein the connecting element is elastically deformable if a force from the input device and acting on the output coupling element exceeds a predetermined threshold value; and
    wherein the tilt angle of the displacement element is not controlled by the input device, as long as the force exceeds the predetermined threshold value.

2. The device according to claim 1, wherein the predetermined threshold value is set by a pre-tensioning force on the connecting element.

3. The device according to claim 2, wherein the pre-tensioning force on the connecting element is adjustable.

4. The device according to claim 1, wherein the connecting element comprises a spring or an elastically deformable element.

5. The device according to claim 4, wherein the spring is an extension spring, a compression spring, a torsion spring or any other type of spring.

6. The device according to claim 1, wherein the linkage element comprises an end-stop limiting the elastic deformation of the connecting element.

7. The device according to claim 1, wherein the input device is a joystick, a lever or a pedal.

8. The device according to claim 1, wherein the displacement command is an electric signal or hydraulic pressure that is translated mechanically onto the input coupling element.

9. The device according to claim 1, wherein the linkage element transmits linear and/or rotational movements.

10. A hydrostatic variable displacement axial piston unit equipped with the displacement volume setting device according to claim 1, wherein the hydrostatic variable displacement unit is of the swashplate or bent axis type.

11. The hydrostatic variable displacement axial piston unit according to claim 10, wherein the hydrostatic variable displacement axial piston unit is a hydrostatic motor, a hydrostatic pump and/or part of a hydrostatic transmission.

12. The device according to claim 2, wherein the connecting element comprises a spring or an elastically deformable element.

13. The device according to claim 3, wherein the connecting element comprises a spring or an elastically deformable element.

14. The device according to claim 2, wherein the linkage element comprises an end-stop limiting the elastic deformation of the connecting element.

15. The device according to claim 3, wherein the linkage element comprises an end-stop limiting the elastic deformation of the connecting element.

16. The device according to claim 4, wherein the linkage element comprises an end-stop limiting the elastic deformation of the connecting element.

17. The device according to claim 5, wherein the linkage element comprises an end-stop limiting the elastic deformation of the connecting element.

\* \* \* \* \*